United States Patent [19]

Homan et al.

[11] 4,268,655

[45] May 19, 1981

[54] FERROCENE CATALYZED ELASTOMER FORMATION

[75] Inventors: Gary R. Homan; Chi-Long Lee, both of Midland, Mich.

[73] Assignee: Dow Corning Corporation, Midland, Mich.

[21] Appl. No.: 99,283

[22] Filed: Dec. 3, 1979

[51] Int. Cl.$^3$ .............................................. C08G 77/06
[52] U.S. Cl. .................................. 528/15; 204/159.13; 260/37 SB; 528/30; 528/32; 528/33
[58] Field of Search ...................... 528/15, 30, 32, 33, 528/901; 260/37 SB; 204/159.13

[56] References Cited

U.S. PATENT DOCUMENTS

| | | | |
|---|---|---|---|
| 3,445,419 | 5/1969 | Vanderlinde | 260/37 |
| 3,655,713 | 4/1972 | Le Grow | 260/448.2 N |
| 3,816,282 | 6/1974 | Viventi | 204/159.13 |
| 3,873,499 | 3/1975 | Michael et al. | 204/159.13 |
| 4,039,504 | 8/1977 | Homan et al. | 260/37 SB |
| 4,039,505 | 8/1977 | Homan et al. | 260/37 SB |
| 4,066,603 | 1/1978 | Homan et al. | 260/37 SB |
| 4,067,027 | 12/1978 | Gant | 204/159.13 |
| 4,070,328 | 1/1978 | Homan et al. | 260/37 SB |
| 4,070,329 | 1/1978 | Homan et al. | 260/37 SB |

FOREIGN PATENT DOCUMENTS 2008426 10/1970 Fed. Rep. of Germany .

*Primary Examiner*—Melvyn I. Marquis
*Attorney, Agent, or Firm*—Roger H. Borrousch

[57] ABSTRACT

Oxygen curable compositions are prepared by mixing mercaptoorganopolysiloxanes, aliphatically unsaturated polydiorganosiloxanes and a dicyclopentadienyl iron compound. Suitable dicyclopentadienyl iron compounds include ferrocene and various ferrocene derivatives.

4 Claims, No Drawings

FERROCENE CATALYZED ELASTOMER FORMATION

BACKGROUND OF THE INVENTION

1. Field of the Invention

This invention relates to oxygen curable compositions including mercaptoorganopolysiloxanes, aliphatically unsaturated polydiorganosiloxanes and a dicyclopentadienyl iron compound.

2. Description of the Prior Art

Applicants' U.S. Pat. Nos. 4,039,504 and 4,039,505 are generally directed to compositions curable to elastomers at room temperature or with heat. These compositions are prepared from mixtures of certain polymethylvinylsiloxanes and mercaptoorganopolysiloxanes with an organic peroxide, and optionally a filler.

Applicants' U.S. Pat. No. 4,070,329 discloses compositions prepared from mixtures of mercaptoorganopolysiloxanes, and organic peroxide catalysts. Applicants' U.S. Pat. No. 4,070,328 discloses compositions prepared from mixtures of mercaptoorganopolysiloxanes, organic hydroperoxide, and selected nitrogen compounds. The compositions prepared according to these references can be used as sealants which rapidly cure to elastomers with non-tacky surfaces.

Numerous other prior art references are directed to compositions involving mercaptoorganopolysiloxanes and mixtures thereof with alkenyl-containing siloxanes as well as to curing systems employing electromagnetic and particulate radiation. These references include: U.S. Pat. No. 3,445,419; U.S. Pat. No. 3,816,282; U.S. Pat. No. 3,873,499; German Pat. Publication (OLS) 2,008,426; U.S. Pat. No. 4,064,027; U.S. Pat. No. 4,066,603; and U.S. patent application Ser. No. 663,326, filed Mar. 3, 1976, by Gary N. Bokerman and Robert E. Kalinowski, entitled "Method of Curing Thick Section Elastomers" and assigned to the same assignee as the present invention, now abandoned. The disclosures of the above-identified patents and applications are specifically incorporated by reference herein for the purpose of exemplifying the state of the prior art.

Although the prior art described elastomeric materials formed by mixing mercaptoorganopolysiloxanes with alkenyl-containing polysiloxanes and organic peroxides, by mixing mercaptoorganopolysiloxanes with organic peroxides alone, or by mixing mercaptoorganopolysiloxanes with organic hydroperoxides and selected nitrogen compounds, it was not expected that useful materials, including elastomeric materials, could be provided by mixing, at room temperature, aliphatically unsaturated polydiorganosiloxanes, mercaptoorganopolysiloxanes and dicyclopentadienyl iron compounds. Nor was it expected that the dicyclopentadienyl iron compounds, when used in mixtures or aliphatically unsaturated polydiorganosiloxanes, mercaptoorgaopolysiloxanes and organic peroxides would substantially increase the rate of curing of the mixture to provide elastomeric compositions.

SUMMARY OF THE INVENTION

According to the present invention, novel compositions of matter are provided by mixing mercaptoorganopolysiloxanes and aliphatically unsaturated polydioganosiloxanes with a dicyclopentadienyl iron compound. Included among the compositions provided according to the invention are compositions curable to elastomers at room temperature in the presence of an oxygen-containing atmosphere such as air. Curable compositions of the invention may optionally include fillers and provide sealants which cure to elastomeric materials with non-tacky surfaces. Compositions additionally including an organic peroxide cure to elastomers in a shorter time than similar compositions not containing the peroxide.

DESCRIPTION OF THE INVENTION

This invention relates to a curable composition comprising a material prepared by mixing:

(A) a mercaptoorganopolysiloxane consisting essentially of a combination of units selected from dimethylsiloxane units, hydroxydimethylsiloxane units, trimethylsiloxane units, units of the formula

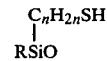

units of the formula

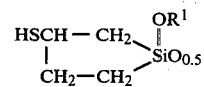

units of the formula

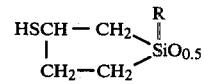

units of the formula

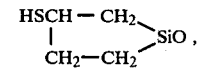

units of the formula

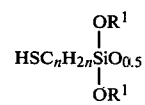

and units of the formula

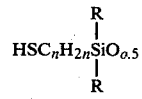

wherein: R is a monovalent radical selected from the group consisting of alkyl radicals of from 1 to 3 carbon atoms inclusive and phenyl radical; $R^1$ is a monovalent radical selected from the group consisting of alkyl radicals of from 1 to 3 carbon atoms inclusive; and n has a value of from 1 to 4 inclusive, there being in said mercaptoorganopolysiloxane an average of at least two sulfur-containing siloxane units per molecule, but not more than 10 mole percent sulfur-containing units based upon the total number of siloxane units in the mercaptoorganopolysiloxane;

(B) an aliphatically unsaturated polydiorganosiloxane having at least three dioganosiloxane units per molecule wherein each unit of the combination forming the molecule is selected from the group consisting of units of the formula

units of the formula

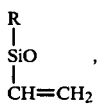

and units of the formula

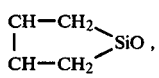

and any endblocking units present being selected from the group consisting of hydroxydimethylsiloxane units, units of the formula

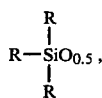

units of the formula

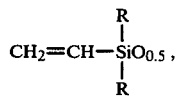

units of the formula

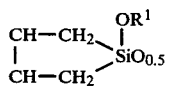

and units of the formula

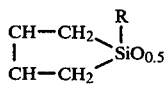

wherein R and $R^1$ are as defined above, there being at least two aliphatically unsaturated siloxane units per molecule;

(C) an organic peroxide in an amount equal to from about 0 to about 10 parts by weight per 100 parts of the combined weight of (A) and (B);

(D) a filler in an amount equal to from about 0 to about 200 parts by weight per 100 parts of the combined weight of (A) and (B); and (E) a dicyclopentadienyl iron compound represented by the structural formula

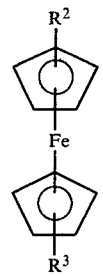

wherein $R^2$ and $R^3$ are the same or different and are selected from the group consisting of hydrogen, lower ($C_1$ to $C_3$) alkyl, acetyl, carboxyl, vinyl and trimethylsilyl; said dicyclopentadienyl iron compound being present in an amount equal to from about 0.01 to about 5 parts by weight per 100 parts of the combined weight of (A) and (B).

Incorporated by reference herein is applicants' U.S. patent application Ser. No. 99,298, pending filed concurrently herewith and entitled "Mercaptoorganopolysiloxane Elastomers Catalyzed by Metallic Compounds in the Presence of Peroxides".

The mercaptoorganosiloxanes which are useful in the practice of the present invention include those consisting essentially of dimethylsiloxane units, trimethylsiloxane units, hydroxydimethylsiloxane units, and units represented by the formulas:

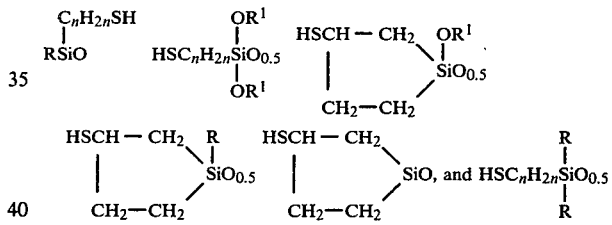

wherein: R is a monovalent radical selected from the group consisting of alkyl radicals of from 1 to 3 carbon atoms inclusive (such as methyl, ethyl or propyl) and phenyl radical; $R^1$ is selected from the group consisting of alkyl radicals having 1 to 3 carbon atoms (such as methyl, ethyl and propyl); and n has a value of from 1 to 4 inclusive, there being present in such mercaptoorganopolysiloxane an average of at least two mercapto-containing siloxane units per molecule and no more than 10 mole percent mercapto-containing units based upon the total units in the mercaptoorganopolysiloxane.

Examples of the mercaptoorganopolysiloxanes include those having "terminal" mercapto groups such as those represented by the formulas I through IV:

I

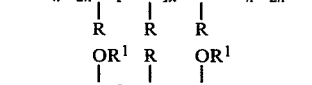

II

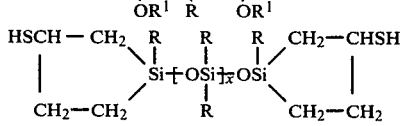

III

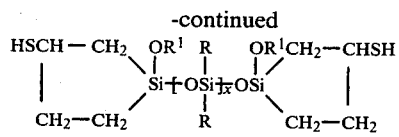 IV wherein R, R¹ and n are as defined above and x has a value of from about 18 to about 1000 and preferably about 200 to about 800, and those having pendant mercapto groups such as those represented by formulas V through VIII:

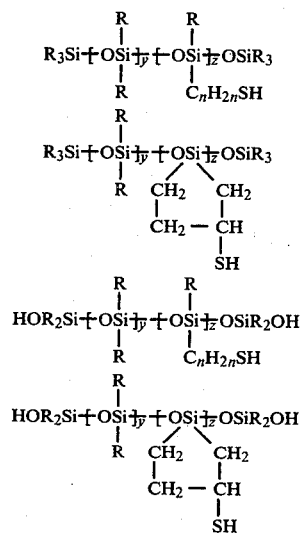

wherein n and R are as above; y+z has a value of from about 18 to about 1000 and preferably about 200 to about 800, and z is at least 2 and no more than a number providing 10 mole percent mercapto-containing siloxane units, based on total siloxane units in the polymer.

The mercaptoorganopolysiloxanes of formulas I and V are known in the art as evidenced by the prior art cited herein. The mercaptosilacyclopentylpolysiloxanes of formulas III and VI and their position isomers can be prepared by the method defined in U.S. Pat. No. 3,655,713, which is hereby incorporated by reference to show the mercaptosilacyclopentylpolysiloxanes and their preparation. The mercaptoorganopolysiloxanes of formula II which contain endblocking units of the formula:

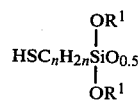

can be prepared by reacting a hydroxyl endblocked polydimethylsiloxane and a mercaptoalkyltrialkoxysilane of the formula:

$HSC_nH_{2n}Si(OR^1)_3$ in the presence of solid potassium hydroxide or potassium silanolate catalysts. The potassium silanolate catalyst is preferred for the higher viscosity polydimethylsiloxanes. The mercaptoalkyltrialkoxysilane is preferably used in excess of about 10 mole percent of stoichiometric amounts. The resulting product is essentially a polydimethylsiloxane endblocked with the units of the formula:

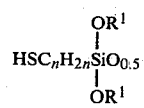

There may be some small amounts of units wherein two SiOH groups have reacted with one mercaptoalkyltrialkoxysilane molecule, but these amounts are small enough that the character of the endblocked polydimethylsiloxane is not noticeably altered.

The aliphatically unsaturated polydiorganosiloxanes which are useful in the practice of the present invention include those having at least three diorganosiloxane units per molecule wherein each unit of a combination forming the molecule is selected from the group consisting of units of the formula

units of the formula

and units of the formula

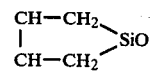

and any endblocking siloxane units present being selected from the group consisting of hydroxydimethylsiloxane units, units of the formula

units of the formula

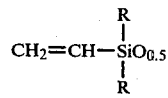

units of the formula

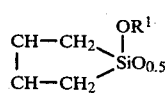

and units of the formula

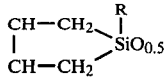

wherein R and $R^1$ are as defined above, there being at least two aliphatically unsaturated siloxane units per molecule.

Examples of the aliphatically unsaturated polydiorganosiloxanes include those having "terminal" unsaturated groups such as those represented by formulas IX through XI

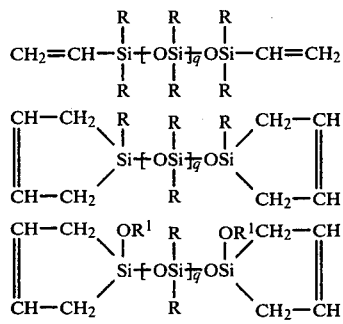

wherein R and $R^1$ are as defined above and q has a value from about 1 to about 1000 and preferably from about 200 to about 800, and those having "pendant" unsaturated groups such as those represented by formulas XII through XV

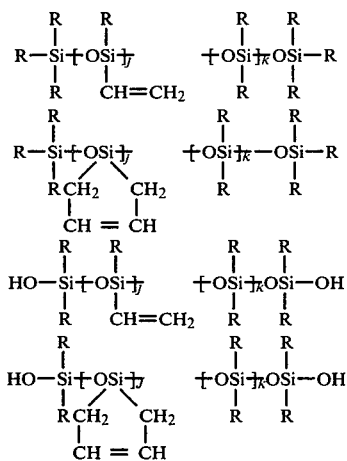

wherein: R is as defined above; the sum of j and k has a value of from about 18 to about 1000 and preferably from about 200 to about 800; and j is at least 2. Also included are cyclic aliphatically unsaturated polydiorganosiloxanes such as those represented by the formula,

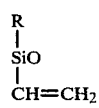

wherein: R is as defined above and is preferably methyl and p has a value of from 3 to 6 inclusive. Aliphatically unsaturated polydiorganosiloxanes having lower molecular weights (around 10,000) seem to form elastomers with surfaces which are somewhat drier than those formed if higher molecular weight polymers are used.

While compositions including mixtures of mercaptoorganopolysiloxanes of any of formulas I through VIII with aliphatically unsaturated polydiorganosiloxanes of any of formulas IX through XIV are useful, if the mercaptoorganopolysiloxanes employed are substantially exclusively the types represented by formulas I through IV (i.e., have terminal mercapto groups), then it is preferred that the aliphatically unsaturated polydiorganosiloxanes be of the types represented by formulas XII through XVI (i.e., have pendant unsaturated groups).

In one especially preferred embodiment, the mercaptoorganopolysiloxane is selected from those compounds represented by formulae V and VII and the aliphatically unsaturated polydiorganosiloxane is selected from those compounds represented by formulae IX, XII, XIV and XVI. In another especially preferred embodiment, the mercaptoorganopolysiloxane is selected from those compounds represented by formulae I and II and the aliphatically unsaturated polydiorganosiloxane is selected from those compounds represented by formulae XII, XIV and XVI.

Suitable dicyclopentadienyl iron compounds can be represented by the structural formula

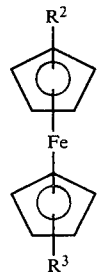

wherein $R^2$ and $R^3$ are the same or different and are selected from the group consisting of hydrogen, lower ($C_1$ to $C_3$) aklyl, acetyl, carboxyl, vinyl and trimethylsilyl. Preferred dicyclopentadienyl iron compounds include dicyclopentadienyl iron (ferrocene), and 1,1' bis-(trimethylsilyl) ferrocene. While the amount of dicyclopentadienyl iron compound used can vary widely, the preferred quantities range from about 0.5 to about 2 parts by weight per hundred parts by weight of (A) and (B) combined.

The curable compositions of the present invention containing a mercaptoorganopolysiloxane, an aliphatically unsaturated polydiorganosiloxane and a dicyclopentadienyl iron compound can be cured by exposure to atmospheric oxygen. At room temperature, the compositions cure at a moderate rate which provides a desirable balance between working time and the amount of time required to cure the composition. For typical compositions including a mercaptoorganopolysiloxane, an aliphatically unsaturated polydiorganosiloxane and a dicyclopentadienyl iron compound, the amount of time required for surface gellation to occur (skin over time) is in the neighborhood of 8 hours while layers up to about a quarter of an inch thick will cure throughout and exhibit a tackfree surface in less than about 24 hours. The rate of curing can be increased by increasing the temperature or by including an organic peroxide. For example, compositions which would need to set overnight to form a skin at room temperature will often form a skin within an hour at 150° C., and compositions including organic peroxides cure in thick section and will often exhibit elastic properties less than an hour after formulation. If both long working times and thick section cures are desired, a free radical scavenger may be included. For example, a peroxide curable composition of this invention which would normally exhibit a working time (pot life) of 20 minutes might exhibit a working time of 90 minutes if about 0.002 weight percent of di-t-butyl nitroxide were added. Other free radical inhibitors include galvinoxyl and triethylamine N-oxide.

Organic peroxides which are suitable for the practice of the present invention include 2,4-dichlorobenzoyl peroxide, tertiary-butyl perbenzoate, benzoyl peroxide, tertiary-butyl peroctoate, paramethane hydroperoxide, tertiary-butyl hydroperoxide and cumene hydroperoxide.

Fillers can be used in the compositions of this invention, but are not required. The fillers can be both treated and untreated reinforcing fillers, such as fume silica and fume silica having triorganosiloxy groups, (e.g., trimethylsiloxy groups) on the surface, carbon black or precipitated silica, and extending fillers such as crushed or ground quartz, diatomaceous earth, and calcium carbonate.

While not intended to be limiting upon the scope of the present invention, it is thought that the curable compositions may crosslink by two different mechanisms, one of which involves the formation of monosulfide bonds while the other involves the formation of disulfide bonds. It is thought that the monosulfide bonds are more thermally stable than the disulfide bonds and that the ratio of monosulfide bonds to disulfide bonds can be influenced by the choice of catalyst, the mole ratio of peroxide to mercapto groups and the mole ratio of vinyl groups to mercapto groups. In general, the dicyclopentadienyl iron compounds favor the formation of the more desirable monosulfide bonds as compared to catalysts such as ferric octoate which promote quicker cures. The formation of monosulfide bonds is also favored by decreasing the ratio of mercapto to vinyl groups, increasing the mole ratio of mercapto groups to peroxide and increasing the mole ratio of mercapto groups to dicyclopentadienyl iron compound. However, it is preferred that the ratio of mercapto to vinyl groups be greater than 1.0/1 for compositions which are to be cured by atmospheric oxygen, since if a lower ratio is used, the surface of the formulation may be tacky after curing. If the ratio of mercapto groups to vinyl groups is less than about 1.0/1, tacky surfaces can be avoided by curing the composition in an enclosed container such as a molding chase or a hot molding press.

Curable compositions having desirable properties are thus formed when the mole ratio of aliphatically unsaturated groups to mercapto groups in the mixture of polymers (A) and (B) is from about 0.1/1 to about 15/1 and preferably from 0.3/1 to 1.0/1. If the composition is to be cured with atmospheric oxygen at room temperature, desirable compositions are formed if the mole ratio of dicyclopentadienyl iron compound to mercapto groups in polymer (A) is from about 0.01/1 to about 1.0/1, and preferably 0.02/1 to 0.2/1. If the curable composition includes an organic peroxide, desirable compositions are formed if the mole ratio of dicyclopentadienyl iron compound to mercapto groups in polymer (A) is from about 0.005/1 to about 1.0/1, preferably 0.01/1 to 0.2/1 and the mole ratio of peroxide molecules to mercapto groups in polymer (A) is from about 0.1/1 to about 5/1, and preferably 0.5/1 to 2/1.

The compositions of this invention which consist of mercaptoorganopolysiloxane, aliphatically unsaturated polydiorganosiloxane and dicyclopentadienyl iron compound can be prepared by mixing in the absence of oxygen to provide a one package product which can be oxygen cured to a gel-like product or an elastomeric product depending upon the crosslink density. The one package products may have limited storage stability in a container sealed to exclude air, however, packaged compositions can be stored up to six months or more. The storage stability should be determined for each composition prepared on a small sample prior to making large amounts of composition. The suitability of the container and manner of sealing should also be determined using small samples. The length of time the composition can be stored in a sealed container can be influenced by the type of container (e.g., the material used to make the container, because some materials can allow oxygen to penetrate); the tightness of the seal; and the nature of the ingredients used to make the composition.

The compositions of this invention which additionally include an organic peroxide can be prepared by mixing mercaptoorganopolysiloxane, aliphatically unsaturated polydiorganosiloxane and dicyclopentadienyl iron compound in the absence of oxygen and storing the resulting formulation in one sealed package and storing the organic peroxide in another to provide a two package system. The two parts are then mixed prior to use to prepare a curable composition. Alternatively, the mercaptoorganopolysiloxane may be stored in one package and the aliphatically unsaturated polydiorganosiloxane, the organic peroxide and the dicyclopentadienyl iron compound stored in another.

The following examples are presented for illustrative purposes and should not be construed as limiting the invention. Unless otherwise stated, all parts and percentages are by weight.

Example 1 illustrates that a mixture of mercaptoorganopolysiloxane and aliphatically unsaturated polydiorganosiloxane cures slowly at 150° C. and apparently does not cure at all at room temperature.

EXAMPLE 1

Twenty-five grams of a methylphenylvinylsiloxy endblocked polydimethylsiloxane of the general formula IX, having a molecular weight of about 10,000, a viscosity of about 0.0004 m$^2$/s at 25° C. and containing about 0.5 weight percent vinyl radicals was mixed with an equal quantity of a mercaptoorganopolysiloxane of the general formula VIII and the average formula

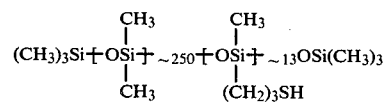

The latter polymer had a viscosity of about 0.00106 m$^2$/s at 27° C. and a mercapto content of 2.25 weight percent —SH (or 0.068 moles —SH/100 g. polymer) as determined by iodine titration. A portion of the formulation was poured into a covered container and stored at room temperature for two months without a change in viscosity. Another portion was poured into an open container and stored at room temperature for two months without a change in viscosity. Another portion was poured into an open container which was placed in an oven at 150° C. and the following observations were made:

(1) After 6 hours, the viscosity was virtually unchanged.

(2) After 20 hours, the sample was partially crosslinked with a tacky surface.

(3) After 28 hours, the surface was tackfree.

(4) After 72 hours, the sample was cured.

Example 2 illustrated that ferrocene will catalyze crosslinking of a mixture of a mercaptoorganopolysiloxane and an aliphatically unsaturated polydiorganosiloxane. This example is presented for comparative purposes.

EXAMPLE 2

A curable composition was prepared by mixing 100 parts of the methylvinylphenylsiloxy endblocked polydimethylsiloxane of Example 1 with 50 parts of the mercaptoorganopolysiloxane of Example 1. This mixture was deaired, then stored in an evacuated sealed tube. Two parts by weight of 9% ferrocene in toluene were blended into the mixture. Upon extrusion of a sample into the atmosphere, a skin formed on the sample in about 5 hours and the sample was cured and tackfree after 9 hours at room temperature. Over three months after formulation, the composition in the tube remained stable and could be extruded and cured.

Example 3 demonstrates that an organic peroxide accelerates crosslinking while Example 4 illustrates the effect of varying the concentration of peroxide. Example 5 illustrates the effect of varying the concentration of the dicyclopentadienyl iron compound in a peroxide cured system.

EXAMPLE 3

A curable composition was prepared by mixing 100 parts of the mercaptoorganopolysiloxane of Example 1 with 46 parts of the methylphenylvinylsiloxy endblocked polydimethylsiloxane of Example 1, 0.5 parts of 9% ferrocene in toluene and 0.5 parts of 73% cumene hydroperoxide. After mixing, the sample was divided into two portions. The first portion which was left at room temperature exposed to air began gelling after 35 minutes and was completely crosslinked after 210 minutes. The second portion which was heated to 150° C. was completely crosslinked in 5 minutes.

EXAMPLE 4

A series of three portions of a curable composition was prepared. Each was formulated by mixing 100 parts of the methylphenylvinylsiloxy endblocked polydimethylsiloxane of Example 1 and 50 parts of the mercaptoorganopolysiloxane of Example 1 with 1 part of 9% ferrocene in toluene. The three portions varied only in the amount of 73% cumene hydroperoxide included. In the first portion, 2 parts of 73% cumene hydroperoxide were used. This portion exhibited elastic properties after 11 minutes (snap time) and was tackfree after 60 minutes at room temperature and exposed to air. In the second portion, 1 part of 73% cumene hydroperoxide was used. This portion exhibited elastic properties after 18 minutes and was tackfree after 130 minutes at room temperature. In the third portion, one-half part of 73% cumene hydroperoxide was used. This portion exhibited elastic properties after 45 minutes and was tackfree after 500 minutes at room temperature. All portions cured throughout their thickness. The results of Example 4 were as summarized in Table 1.

TABLE 1

| Portion No. | Parts Peroxide | Snap-Time (minutes) | Tackfree Time (minutes) |
|---|---|---|---|
| 1 | 2 | 11 | 60 |
| 2 | 1 | 18 | 130 |
| 3 | 0.5 | 45 | 500 |

EXAMPLE 5

A series of three portions of a curable composition was prepared as in Example 3 except that 2 parts of 73% cumene hydroperoxide were included in each and the parts of 9% ferrocene varied from portion to portion. The first portion included 3 parts of ferrocene solution, exhibited elastic properties after 11 minutes and was tackfree after 60 minutes at room temperature. The second portion included 1 part of ferrocene solution, exhibited elastic properties after 11 minutes and was tackfree after 90 minutes at room temperature. The third portion included one-half part ferrocene solution, exhibited elastic properties after 13 minutes and was tackfree after 270 minutes at room temperature. All of the portions cured throughout their thickness. The results of Example 5 were as summarized in Table 2.

TABLE 2

| Portion No. | Parts Ferrocene Solution | Snap Time (Minutes) | Tackfree Time (Minutes) |
|---|---|---|---|
| 1 | 3 | 11 | 60 |
| 2 | 1 | 11 | 90 |
| 3 | 0.5 | 13 | 270 |

Example 6 demonstrates heat press molding of mixtures of the invention and illustrates the effect of varying the concentration of the aliphatically unsaturated polydiorganosiloxane on the physical properties of the resulting elastomer.

EXAMPLE 6

A series of four portions of the curable composition was prepared. Each was formulated by mixing 100 parts of a mercaptopropyl endblocked polydimethylsiloxane of the general formula I having a viscosity of about 0.014 m$^2$/s and containing 0.16 wt% terminal —SH with 30 parts of fume silica having trimethylsiloxy groups attached to its surface, 1.3 parts of 9% ferrocene in toluene, 1.3 parts of 73% cumene hydroperoxide and X parts of a trimethylsiloxy endblocked polydimethylsiloxane of the general formula XII having 7.26 weight percent vinyl groups and a viscosity of about 0.021 m$^2$/s.

Each sample was heat press cured at 125° C. for 15 minutes in a molding chase. The first portion was poorly cured but the others were highly crosslinked with a tackfree surface. The physical properties of these portions were measured and are reported in Table 3.

TABLE 3

| Portion No. | 1 | 2 | 3 | 4 |
|---|---|---|---|---|
| X | 1.8 | 3.6 | 7.2 | 18.0 |
| Moles-SH/ Moles Vinyl | 1.0 | 0.50 | 0.25 | 0.10 |
| Durometer (Shore A Scale) | — | 8 | 13 | 16 |

TABLE 3-continued

| Portion No. | 1 | 2 | 3 | 4 |
|---|---|---|---|---|
| Tensile Strength (MPa) | — | 1.17 | 1.79 | 2.48 |
| Elongation at Break % | — | 770 | 700 | 640 |
| Modulus at (MPa) | | | | |
| 100% | — | 0.21 | 0.21 | 0.24 |
| 300% | — | 0.41 | 0.59 | 0.79 |
| 500% | — | 0.69 | 1.10 | 1.65 |

Example 7 illustrates the preparation of trimethylsilyl ferrocene and bis-(trimethylsilyl) ferrocene.

EXAMPLE 7

A three-liter, three-neck flask was equipped with a gas dispersion tube, a reflux condenser, a thermometer, a stirrer and a septum inlet tube. The reactants charged into the flask were 93 grams of ferrocene (0.5 moles) and 900 grams of anhydrous diethylether. These reactants were stirred while being purged with dry nitrogen at room temperature. After an hour, 625 ml of 1.6 molar n-butyl lithium (1.0 moles) were added in portions of 100 ml. or less. The solution was heated to reflux, maintained at reflux for 20 hours then cooled. The nitrogen purge was continued while the solution cooled to room temperature. Then 450 grams of diethylether were added followed by 218 grams of trimethylchlorosilane (2.0 moles) which were gradually added over a 30-minute period while maintaining controllable reflux. After the mixture was allowed to react for 18 hours at room temperature, a white precipitate was removed by filtration and the remaining solvent stripped. The monoadduct, trimethylsilyl ferrocene, which boiled at 117° C. and 133 Pa pressure and the diadduct, bis-(trimethylsilyl) ferrocene, which boiled at 130° C. and 307 Pa pressure were separated by distillation and the structures confirmed by both nuclear magnetic resonance and infrared analysis.

Example 8 illustrates the use of various dicyclopentadienyl iron compounds in the practice of the invention.

EXAMPLE 8

A series of samples of a curable composition was prepared. Each included a mixture of 100 parts of the methylphenylvinylsiloxy endblocked polydimethylsiloxane of Example 1, 54 parts of the mercaptoorganopolysiloxane of Example 1 and 0.77 parts of a 0.2 molar solution of a dicyclopentadienyl iron compound which was prepared in a sealed tube as described in Example 2. A sample was extruded from each tube. Each sample was divided into two portions, a low temperature and a high temperature portion. Each low temperature portion was exposed to the atmosphere at room temperature. A skin about one-eighth inch thick formed on each of these low temperature portions after setting overnight. The high temperature portion of each sample was heated to 150° C. while exposed to the atmosphere. The length of time required for a skin to form on each of the high temperature portions is reported in Table 4.

TABLE 4

| Portion | Catalyst | Skinover Time at 150° C. (Minutes) |
|---|---|---|
| 1 | ferrocene | 60 |
| 2 | trimethylsilyl ferrocene | 40-45 |
| 3 | bis-(trimethylsilyl) ferrocene | 45 |
| 4 | diacetylferrocene | 30 |
| 5 | dimethylferrocene | 60-70 |

TABLE 4-continued

Example 9 illustrates the use of a two-part system which cures in deep section while Example 10 illustrates the use of a free radical scavenger to extend the pot life of the system of Example 9.

EXAMPLE 9

A curable composition was prepared in two parts. One part was prepared by mixing 100 parts of the methylphenylvinylsiloxy endblocked polydimethylsiloxane of Example 1 with 2 parts of 73% cumene hydroperoxide and 2 parts of 9% ferrocene in toluene. The other part was 104 parts of a mercaptopropyl polydimethylsiloxane represented by the general formula V having 2 mole % —SH and a viscosity of about 0.0012 m$^2$/s. The two parts were mixed in equal volume, and the resulting composition was divided into two portions. The first portion which was heated to 150° C. while exposed to the atmosphere, cured tackfree in 5 minutes. The second portion, which was left exposed to the atmosphere at room temperature, cured tackfree in 18 hours.

EXAMPLE 10

A curable composition was prepared according to the procedure set forth in Example 9 then divided into two portions. The first portion was periodically tested for workability. It remained workable for 20 minutes. To extend the pot life, 0.0023 weight percent di-t-butyl nitroxide was added to the second portion, which then remained workable for 90 minutes.

Example 11 illustrates the use of ferrocene to cure a mixture of polymethylvinylsiloxane cyclics and a mercaptopropyl endblocked polydimethylsiloxane.

EXAMPLE 11

A curable composition was prepared by mixing 100 parts of a mercaptopropyl endblocked polydimethylsiloxane represented by the general formula I having a viscosity of about 0.004 m$^2$/s at 22° C. and containing 0.23 weight percent —SH with 0.7 parts of polymethylvinylsiloxane cyclic oligomers (primarily trimer) with 1 part of 9% ferrocene in toluene and 1 part of 73% cumene hydroperoxide. The composition was divided into two portions. One portion which was allowed to set at room temperature, cured to a soft gel in less than 24 hours. Another portion, which was heated to 100° C., cured to a soft gel in 15 minutes.

Numerous modifications and variations in the practice of the invention are expected to occur to those skilled in the art upon consideration of the foregoing description and only such limitations as appear in the appended claims should be placed thereon.

What is claimed is:

1. A composition of matter comprising a material prepared by mixing (A) a mercaptoorganopolysiloxane consisting essentially of a combination of units selected from dimethylsiloxane units, hydroxydimethylsiloxane units, trimethylsiloxane units, units of the formula units of the formula

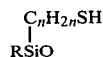

units of the formula

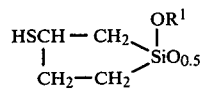

units of the formula

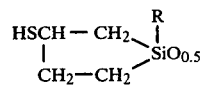

units of the formula

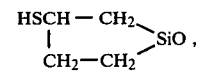

units of the formula

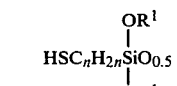

and units of the formula

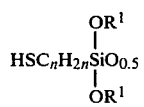

wherein: R is a monovalent radical selected from the group consisting of alkyl radicals of from 1 to 3 carbon atoms inclusive and phenyl radical; $R^1$ is a monovalent radical selected from the group consisting of alkyl radicals of from 1 to 3 atoms inclusive; and n has a value of from 1 to 4 inclusive, there being in said mercaptoorganopolysiloxane an average of at least two sulfur-containing siloxane units per molecule, but not more than 10 mole percent sulfur-containing units based upon the total number of siloxane units in the mercaptoorganopolysiloxane;

(B) an aliphatically unsaturated polydiorganosiloxane having at least three diorganosiloxane units per molecule wherein each unit of the combination forming the molecule is selected from the group consisting of units of the formula

units of the formula

and units of the formula

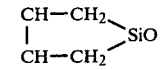

and any endblocking units present being selected from the group consisting of hydroxydimethylsiloxane units, units of the formula

units of the formula

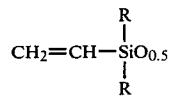

units of the formula

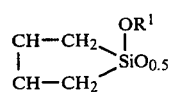

and units of the formula

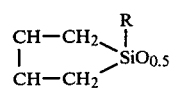

wherein R and $R^1$ are as defined above, there being at least two aliphatically unsaturated siloxane units per molecule;

(C) an organic peroxide in an amount equal to from about 0 to about 10 parts by weight per 100 parts of the combined weight of (A) and (B);

(D) a filler in an amount equal to from about 0 to about 200 parts by weight per 100 parts of the combined weight of (A) and (B); and (E) a dicyclopentadienyl iron compound represented by the structural formula

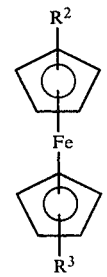

wherein $R^2$ and $R^3$ are the same or different and are selected from the group consisting of hydrogen, lower ($C_1$ to $C_3$) alkyl, acetyl, carboxyl, vinyl and trimethylsilyl; said dicyclopentadienyl iron compound being present in an amount equal to from about 0.01 to about 5 parts by weight per 100 parts of the combined weight of (A) and (B).

2. The composition according to claim 1 in which (E) is ferrocene.

3. A method of making a composition curable by exposure to oxygen gas comprising mixing under conditions to exclude oxygen (A) a mercaptoorganopolysiloxane consisting essentially of a combination of units selected from dimethylsiloxane units, hydroxydimethylsiloxane units, trimethylsiloxane units, units of the formula

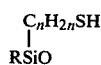

units of the formula

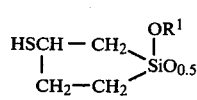

units of the formula

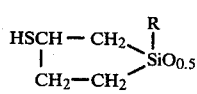

units of the formula

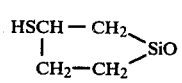

units of the formula

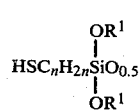

and units of the formula

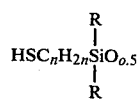

wherein: R is a monovalent radical selected from the group consisting of alkyl radicals of from 1 to 3 carbon atoms inclusive and phenyl radical; $R^1$ is a monovalent radical selected from the group consisting of alkyl radicals of from 1 to 3 atoms inclusive; and n has a value of from 1 to 4 inclusive, there being in said mercaptoorganopolysiloxane an average of at least two sulfur-containing siloxane units per molecule, but not more than 10 mole percent sulfur-containing units based upon the total number of siloxane units in the mercaptoorganopolysiloxane;

(B) an aliphatically unsaturated polydiorganosiloxane having at least three diorganosiloxane units per molecule wherein each units of the combination forming the molecule is selected from the group consisting of units of the formula

units of the formula

and units of the formula

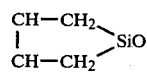

and any endblocking units present being selected from the group consisting of hydroxydimethylsiloxane units, units of the formula

units of the formula

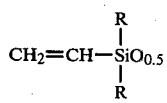

units of the formula

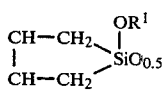

and units of the formula

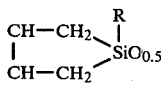

wherein R and $R^1$ are as defined above, there being at least two aliphatically unsaturated siloxane units per molecule;

(C) a filler in an amount equal to from about 0 to about 200 parts by weight per 100 parts of the combined weight of (A) and (B); and (D) a dicyclopentadienyl iron compound represented by the structural formula

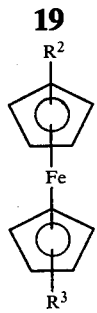

wherein $R^2$ and $R^3$ are the same or different and are selected from the group consisting of hydrogen, lower ($C_1$ to $C_3$) alkyl, acetyl, carboxyl, vinyl and trimethylsilyl; said dicyclopentadienyl iron compound being present in an amount equal to from about 0.01 to about 5 parts by weight per 100 parts of the combined weight of (A) and (B).

4. The method in accordance with claim 3 in which the composition prepared in claim 3 is exposed to oxygen gas and a cured product forms.

* * * * *

UNITED STATES PATENT AND TRADEMARK OFFICE
CERTIFICATE OF CORRECTION

PATENT NO. : 4,268,655

DATED : May 19, 1981

INVENTOR(S) : Gary R. Homan and Chi-long Lee

It is certified that error appears in the above—identified patent and that said Letters Patent is hereby corrected as shown below:

Column 3 - the formula reading

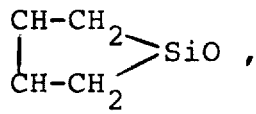

should read

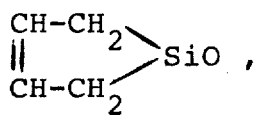

Column 3 - the formula reading

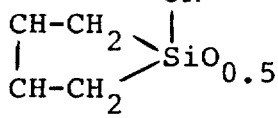

should read

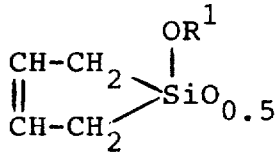

Column 3 - the formula reading

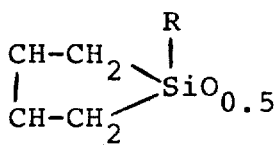

UNITED STATES PATENT AND TRADEMARK OFFICE
CERTIFICATE OF CORRECTION

PATENT NO. : 4,268,655

DATED : May 19, 1981

INVENTOR(S) : Gary R. Homan and Chi-long Lee

It is certified that error appears in the above—identified patent and that said Letters Patent is hereby corrected as shown below:

should read

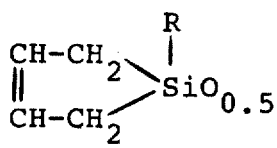

Column 6 - the formula reading

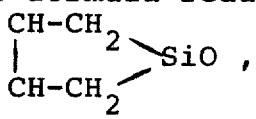

should read

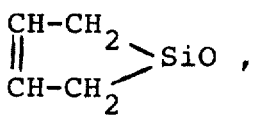

Column 6 - the formula reading

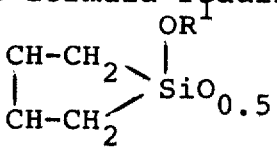

should read

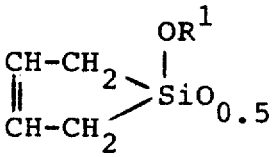

UNITED STATES PATENT AND TRADEMARK OFFICE
CERTIFICATE OF CORRECTION

PATENT NO. : 4,268,655

DATED : May 19, 1981

INVENTOR(S) : Gary R. Homan and Chi-long Lee

It is certified that error appears in the above—identified patent and that said Letters Patent is hereby corrected as shown below:

Column 7 - the formula reading

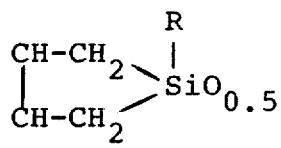

should read

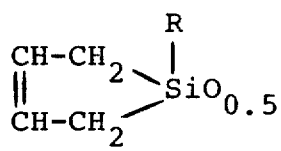

Column 7 - the formula reading

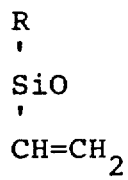

should read

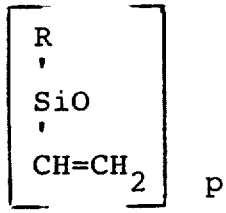    XVI

UNITED STATES PATENT AND TRADEMARK OFFICE
CERTIFICATE OF CORRECTION

PATENT NO. : 4,268,655

DATED : May 19, 1981

INVENTOR(S) : Gary R. Homan and Chi-long Lee

It is certified that error appears in the above—identified patent and that said Letters Patent is hereby corrected as shown below:

Column 16 - the formula reading

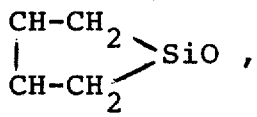

should read

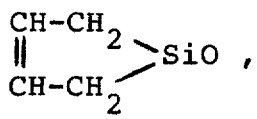

Column 16 - the formula reading

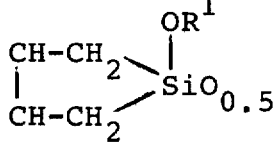

should read

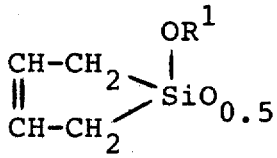

Column 16 - the formula reading

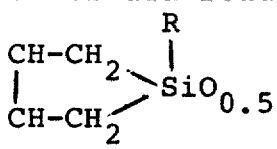

should read

UNITED STATES PATENT AND TRADEMARK OFFICE
CERTIFICATE OF CORRECTION

PATENT NO. : 4,268,655

DATED : May 19, 1981

INVENTOR(S) : Gary R. Homan and Chi-long Lee

It is certified that error appears in the above—identified patent and that said Letters Patent is hereby corrected as shown below:

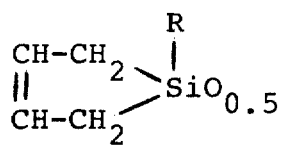

Column 18 - the formula reading

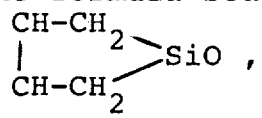

should read

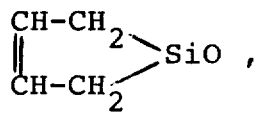

Column 18 - the formula reading

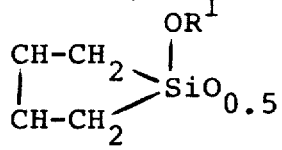

should read

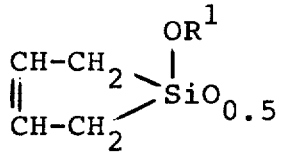

Column 18 - the formula reading

UNITED STATES PATENT AND TRADEMARK OFFICE
CERTIFICATE OF CORRECTION

PATENT NO. : 4,268,655

DATED : May 19, 1981

INVENTOR(S) : Gary R. Homan and Chi-Long Lee

It is certified that error appears in the above—identified patent and that said Letters Patent is hereby corrected as shown below:

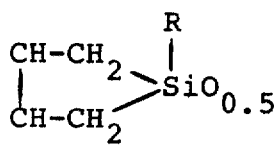

should read

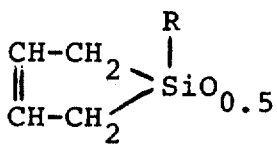

Signed and Sealed this

Sixteenth Day of November 1982

[SEAL]

Attest:

*Attesting Officer*

GERALD J. MOSSINGHOFF

*Commissioner of Patents and Trademarks*